United States Patent [19]

Escaravage

[11] Patent Number: 4,702,493
[45] Date of Patent: Oct. 27, 1987

[54] DEVICE FOR ADJUSTING THE POSITION OF A STRAP RETURN ELEMENT, OF IN PARTICULAR A SAFETY BELT FOR A MOTOR VEHICLE

[75] Inventor: Gérard Escaravage, Valentigney, France

[73] Assignee: Aciers et Outillage Peugeot, Audincourt, France

[21] Appl. No.: 922,508

[22] Filed: Oct. 23, 1986

[30] Foreign Application Priority Data

Oct. 24, 1985 [FR] France .................................. 85 15831
Feb. 7, 1986 [FR] France .................................. 86 01717

[51] Int. Cl.$^4$ ............................................ B60R 22/02
[52] U.S. Cl. ............................... 280/808; 74/424.8 R; 74/89.15
[58] Field of Search ............... 280/801, 802, 804, 808; 297/469, 483; 310/191, 209, 15, 16, 17, 80; 200/1 V, 16 C, 16 D, 16 F; 74/424.6, 424.8 R, 89.14, 89.15

[56] References Cited

U.S. PATENT DOCUMENTS 4,547,717 10/1985 Radermacher et al. ............ 280/804

FOREIGN PATENT DOCUMENTS 0136166 4/1985 European Pat. Off. .
7523101 7/1975 Fed. Rep. of Germany .
2107446 5/1972 France .
2513887 4/1983 France .

Primary Examiner—David M. Mitchell
Assistant Examiner—Karin L. Ferriter
Attorney, Agent, or Firm—Sughrue, Mion, Zinn, Macpeak, and Seas

[57] ABSTRACT

In this device for adjusting the position of a strap return element of in particular a safety belt for a motor vehicle, the strap return element is mounted to be movable between two end positions by driving means comprising an electric motor (5) supplied with current by means of a control element (2) controlling the position of the strap return element at any point of the travel of the strap return element defined by the two end positions. The strap return element is disposed on an anchoring pin (4) mounted on the electric motor (5). This motor is mounted to be movable axially between the two end positions.

17 Claims, 11 Drawing Figures

DEVICE FOR ADJUSTING THE POSITION OF A STRAP RETURN ELEMENT, OF IN PARTICULAR A SAFETY BELT FOR A MOTOR VEHICLE

The present invention relates to a device for adjusting the position of a strap return element of in particular a safety belt for a motor vehicle.

In most vehicles, this strap return element is disposed on an anchoring pin fixed to the body of the vehicle at a height suitable for most users of so-called normal height.

However, this height is not suitable for certain users, particularly for short persons To overcome this problem, a number of mechanical devices are known in the prior art for adjusting the height of this strap return element However, these devices have a number of drawbacks, in particular in respect of the possibilities of adjustment, their relatively complex structure, and therefore their relatively high manufacturing and mounting costs.

An object of the invention is to overcome the problems mentioned hereinbefore by proposing a rapid and precise device for adjusting the position of the strap return element, so as to adapt the strap to the morphology of the user.

The invention therefore provides a device for adjusting the position of a strap return element of in particular a safety belt for a motor vehicle wherein the strap return element is mounted to be movable between two end positions by driving means including an electric motor supplied with current through an element controlling the position of said return element at any point of the travel of the latter defined by the two end positions the strap return element being disposed on an anchoring pin connected to the electric motor, and said electric motor being mounted to be axially movable between said two end positions in a tube, said device further comprising means for preventing the rotation of the armature of the electric motor, the field magnet of the latter being mounted to be rotatable about the armature, at least one part of the outer surface of the field magnet of the motor having a screwthread cooperative with complementary means connected to the tube so as to move the motor, and consequently the strap return element, when the field magnet rotates, and the means for preventing the rotation of the armature are constituted by the anchoring pin of the strap return element, one of the ends of said pin projecting into the tube through a slot provided in the tube, said end of the anchoring pin being connected to one of the ends of the shaft of the field magnet of the electric motor by fixing means.

A better understanding of the invention will be had from the following description which is given solely by way of an example with reference to the accompanying drawings, in which.

Figures 1, 2:
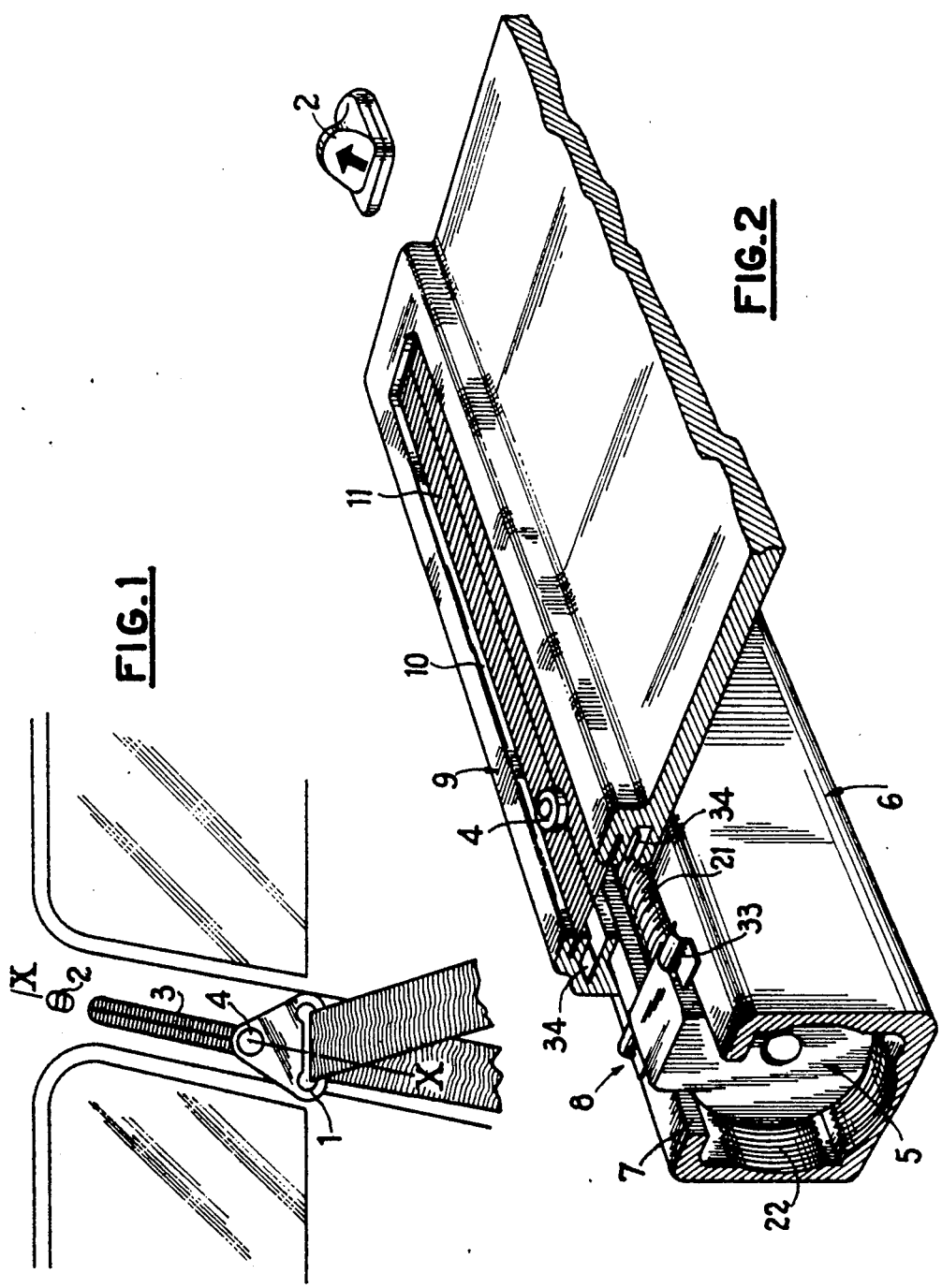
FIG. 1 is a view of a compartment of a motor vehicle equipped with an adjusting device according to the invention.
FIG. 2 is a perspective view, with parts cut away, of an adjusting device according to the invention.

As can be seen in FIG. 1, a strap return element 1 is mounted to be movable along an axis X—X between two end positions, on a vertical post of a motor vehicle. An element for controlling the position of this strap return element, which will be described hereinafter, is disposed for example above a slot 3 in which is movable an anchoring pin 4 of the strap return element 1.

The anchoring pin 4 (FIG. 2) is mounted on an electric motor 5 which is mounted to be axially movable between the two end positions in a tube 6 which is internally tapped and fixed to the body of the vehicle. This tube has in its upper part a slot 7 through which project the anchoring pin 4 and a part 8 of supply means for this electric motor which will be described in more detail hereinafter.

An insulating support member 9, fixed to the tube 6, comprises a slot 10 in facing relation to the slot 7 of the tube and deformable means 11 for closing the slot 10. The anchoring pin 4 is therefore movable with the motor between the two end positions of this slot by deforming the deformable means 11 as it passes therethrough, these means resuming their initial position after the passage of the pin so as to close this slot. Thus, no dust or foreign body can enter the mechanism of the device according to the invention.

Figure 3:
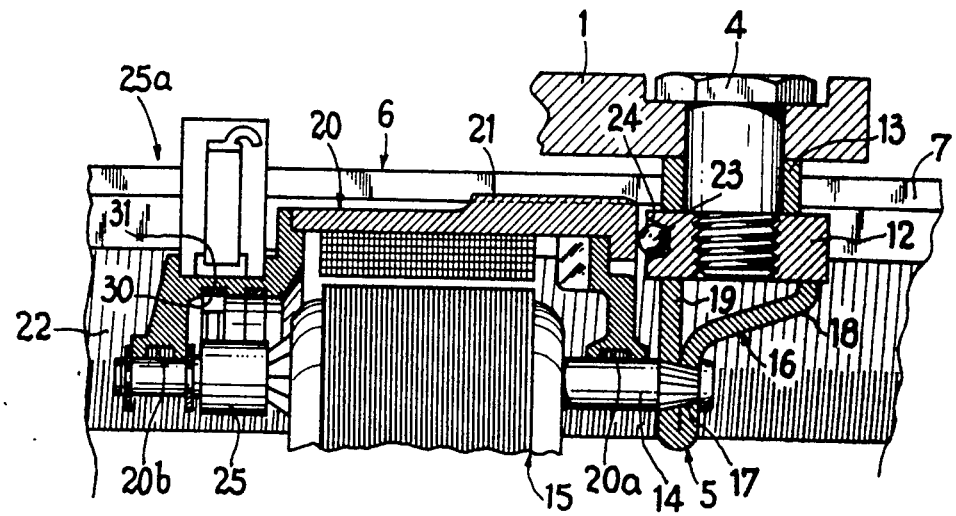
FIG. 3 is a sectional view of an adjusting device according to the invention.

As shown in FIG. 3, the anchoring pin 4 on which the strap return element 1 is disposed comprises an end portion which projects into the tube 6 through the slot 7. This end portion of the anchoring pin is for example screwed into a connecting member 12. A spacer member 13 is disposed around the anchoring pin 4, between the connecting member 12 and the strap return element 1, this spacer member cooperating with the edges of the slot 7 of the tube so as to guide the anchoring pin when it is moved. This spacer member also maintains the strap return element at a predetermined distance from the connecting member 12.

Further, the connecting member 12 cooperates with the inner surfaces of the edge portions of the slot 7 of the tube so as to retain the anchoring pin in position.

This connecting member 12 is fixed to one end of a shaft 14 of an armature 15 of the electric motor 5 by a metal strip 16 having an end portion defining an opening 17 engaged on the corresponding end portion of the shaft of the armature and an opposite end portion having wings 18 and 19 which, as will be seen hereinafter, include recesses in which are engaged bosses of the connecting member 12 for driving the latter, and, consequently, the strap return element, when the electric motor moves inside the tube.

The electric motor 5 further comprises a field magnet 20 which is rotatively mounted by bearings 20a and 20b relative to the armature 15, at least a part of the outer surface of the field magnet having a screwthread 21 cooperative with a tapping 22 formed in the inner surface of the tube 6.

Note that the anchoring pin 4 is connected to the armature 15 of the electric motor and this armature is therefore prevented from rotating. Indeed, the anchoring pin is connected to the shaft of the armature and extends through the slot 7 of the tube 6 and cooperates with the edges of the latter for preventing any rotation of the armature.

In this case, when the electric motor is supplied with current, it is the field magnet 20 which rotates about the armature so that the outer screwthread 21 of the field magnet cooperates with the inner screwthread 22 of the tube and causes the assembly to move relative to the tube.

Note moreover that the surface of the connecting member 12 in facing relation to a corresponding surface of the field magnet 20 has anti-friction means so as to limit friction in this region between the two parts.

Thus, for example, the anti-friction means are formed by a ball 23 disposed in a recess 24 provided for this purpose in the connecting member 12.

As can be seen in this Figure, the other end of the armature 15 has a commutator or slip-ring 25 for supplying current to the electric motor. The supply means 25a of this commutator will be described in more detail hereinafter.

Figure 4:
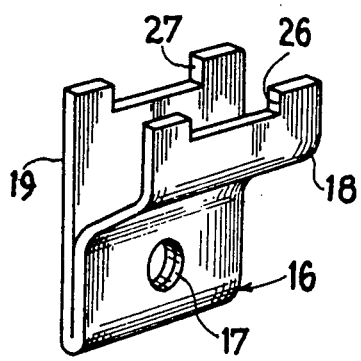
FIGS. 4 and 5 are views to an enlarged scale of connecting means which are part of a device according to the invention.
Figure 5:
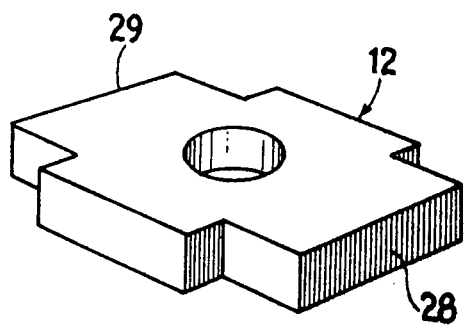

FIGS. 4 and 5 show in more detail the means for fixing the anchoring pin on the shaft of the armature of the motor. Thus, for example, the metal strip 16 has at one of its ends the opening 17 adapted to be engaged on the corresponding end portion of said shaft. At its other end, this metal strip has two wings 18 and 19 defining recesses 26 and 27 respectively, in which are engaged bosses 28 and 29 respectively of the connecting member 12 (FIG. 5). As already mentioned, these wings enable the connecting member to be moved when the electric motor moves inside the tube so as to transmit this movement to the anchoring pin 4 through the connecting member 12 and thus move the strap return element 1.

Figure 6:
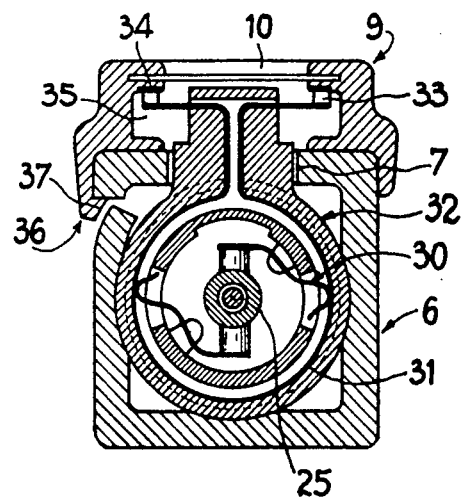
FIG. 6 is a view of a first embodiment of the supply means which are part of a device according to the invention.

As shown in FIG. 6, the commutator 25 of the motor may be supplied with current through a first set of brushes 30 connected to the commutator of the electric motor, these brushes being in contact with a first set of conductive tracks 31 disposed axially of the inner surface of a ring 32 mounted on the armature of the motor, these conductive tracks being connected through a second set of brushes 33 to a second set of conductive tracks 34 disposed on each side of the slot 7 of the tube 6, and more particularly along the slot 10 of the support member 9, this second set of conductive tracks being connected to the supply source of the vehicle through the element 2 controlling the position of the strap return element 1.

This control element comprises for example a reversing switch having three positions whereby it is possible to connect the tracks of the second set of conductive tracks 34 to the supply source, so that the electric motor, and therefore the strap return element, move either in one direction or in the other, depending on the polarity of the set of tracks 34, to a desired position, and to cut off this supply when this position is reached, so as to immobilize the motor and thus determine a new position of the strap return element.

These tracks of the second set of tracks 34 are disposed on each side of the slot 10 of the support member 10, in cavities 35 provided for this purpose in the support member fixed to the tube 6 by means of fixing lugs 36 having projecting portions 37 cooperative with recesses provided for this purpoose in the lateral walls of the tube.

The set of brushes 33 moves with the electric motor when the latter is supplied with current and it is always in contact with the set of tracks 34 so that it is ensured that the motor is supplied with current so long as the inverting switch is not in its position of rest. Thus, the control element 2 for the setting of the strap return element permits a positioning of the strap return element at any point of its travel defined by the two end positions.

Figure 7:
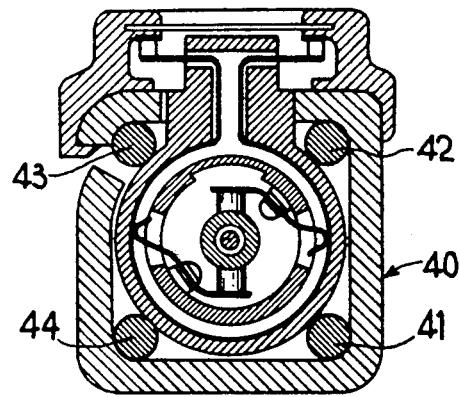
FIG. 7 is a sectional view of a modification of an adjusting device according to the invention.

In a modification shown in FIG. 7, the electric motor is mounted to be movable within a tube 40, for example of square section, the field magnet of this motor having an outer screwthread cooperating, for example, with four screwthreaded rods 41 to 44, fixed in the four corners of the tube respectively, so as to ensure the displacement of the motor, and consequently of the strap return element, when the field magnet rotates.

It will be understood that three screwthreaded rods, for example disposed at 120° to each other, may be sufficient to permit the displacement of the motor inside the tube. The tube may also have a section other than a square section.

The other elements and the operation of this embodiment are identical to those of the preceding embodiment and will not be described in more detail.

As described before, the means for supplying current to the electric motor which are part of the device according to the invention comprise a first set of brushes connected to the commutator of the electric motor, these brushes being in contact with a first set of conductive tracks disposed axially on the inner surface of a ring connected to the armature of the motor.

The elements of the control means which will be described hereinafter will therefore constitute the means for connecting these conductive tracks of the ring to the source of current of the vehicle.

Figure 8:
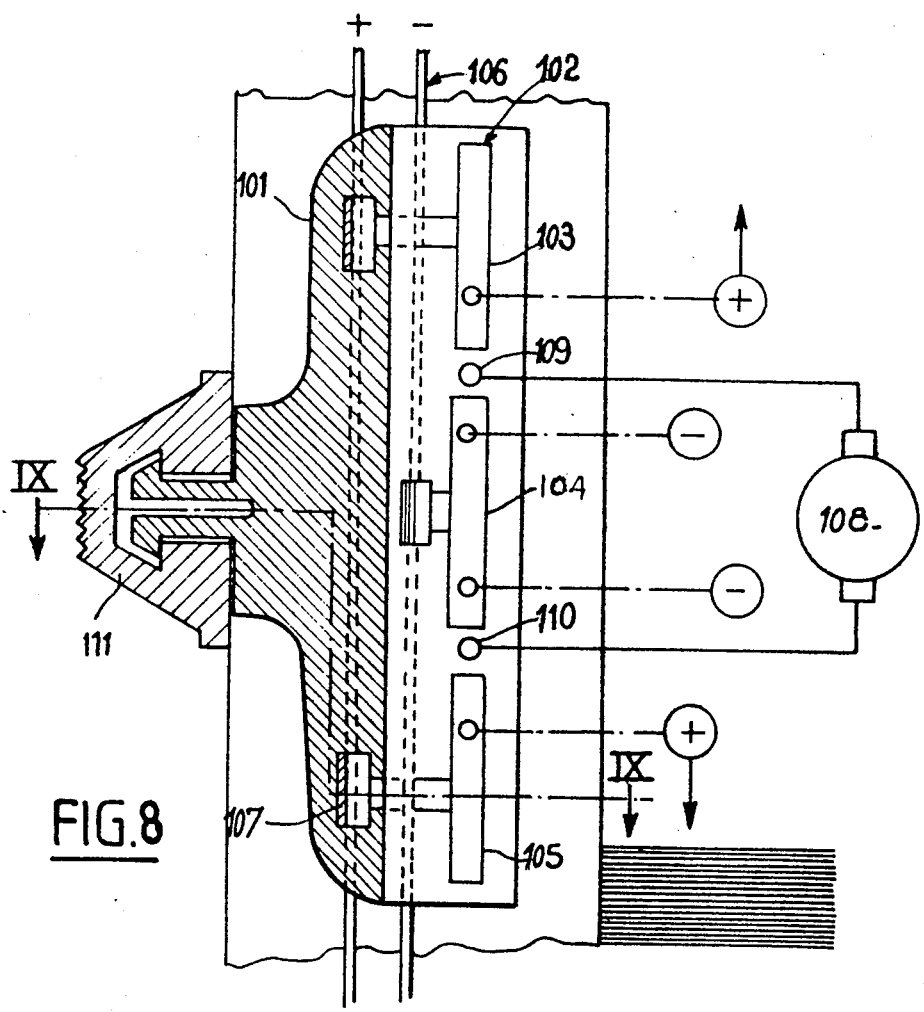
FIG. 8 is a second embodiment of the supply means which are part of a device according to the invention.
Figure 9:
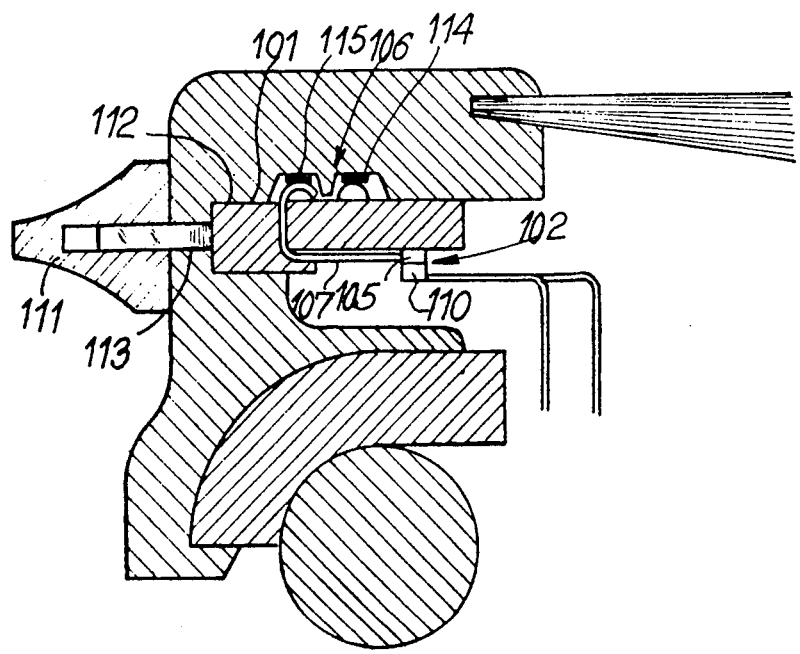
FIG. 9 is a sectional view to an enlarged scale taken on line IX—IX of FIG. 8, and FIGS. 10 and 11 are views of a third embodiment of the supply means which are part of a device according to the invention.

According to the embodiment shown in FIGS. 8 and 9, the element for controlling the position of the strap return element comprises a slide 101 on which is disposed a first set 102 of three conductive tracks respectively 103, 104, 105 which are roughly in alignment and separated from one another by a free space for cutting off the supply of the electric motor, and connected to the supply source of the vehicle so as to have successively alternating polarities. These conductive tracks are connected to a second set 106 of conductive tracks connected to the positive and negative terminals of the supply source of the vehicle through brushes, for example 107 in respect of the conductive tracks 105. Thus, in the presently-described embodiment, the conductive tracks 103 and 105 have a positive polarity, while the track 104 has a negative polarity.

The electric motor 108 for moving the strap return element comprises two brushes 109 and 110 connecting the tracks of the ring to the rest of the control element and which, as shown in FIG. 8, are in facing relation to free spaces between the conductive tracks. These brushes 109 and 110 are adapted to cooperate with the conductive tracks 103, 104 so as to supply current to the motor in such manner that it moves in a given direction, or with the conductive tracks 104, 105 so as to supply the motor in such manner that it moves in the opposite direction. This control of the motor depends on the displacement of the slide 101 relative to the brushes 109 and 110 supplying current to the motor. Indeed, a slider 111 connected to the slide is mounted to be manually movable along the strap return element-adjusting travel so as to regulate the position of the slide 101, and therefore of the free spaces, for cutting off the supply of the motor and thus determine its position and that of the strap return element. Depending on the direction in which the slider and therefore the slide is shifted, the electric motor is supplied with current in either direction, until it reaches the desired position of adjustment in which the sliders 109 and 110 are in facing relation to gaps for cutting off the supply of the motor.

As can be seen more clearly in FIG. 9, the slider 111 causes the displacement of the slide 101, which is for example in the form of an insulating plate, in a slideway 112 of a support structure mounted on the vehicle. This support structure includes a slot 113 through which extends a portion of the slide 101 on which the slider 111 is fixed. The conductive tracks of the set of tracks 106 are for example disposed in recesses 114 and 115 provided for this purpose in the support structure.

Further, in order to explain the operation of the device, the brush 110 of the motor has been shown bearing against the conductive track 105.

As described before, the strap return element is mounted on the stator of the electric motor and the latter is mounted to be axially movable between the two end positions so that the adjustment of the position of the slider, and therefore of the motor supply-cutting off gaps, permits the position of the strap return element to be adjusted.

Note that, in the described embodiment, as the brushes connect the first set 102 of the conductive tracks to the second set 106, for example, the brush 107 for the track 105 extends through the insulating plate constituting the slide.

The other component parts of this device are identical to those described before, and will not be described in more detail.

Figure 10:
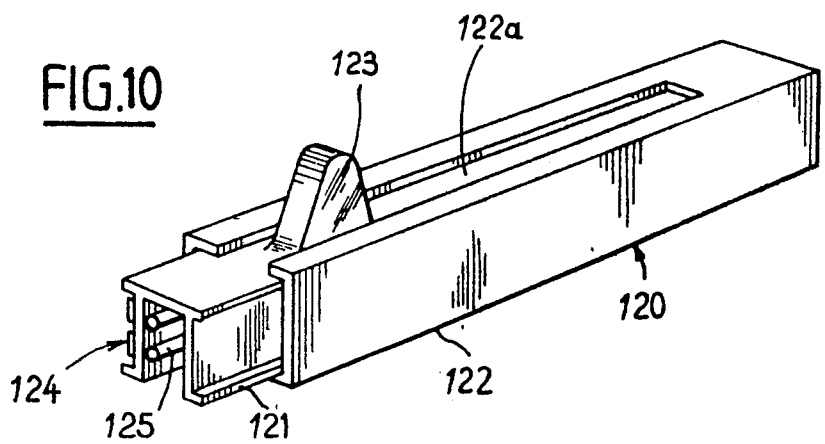

The control element 120 (FIG. 10) may also include a slide 121 mounted to be slidably movable in a slideway 122 by means of a slider 123 which projects out of the slideway through a slot 122a provided for this purpose in the latter, so that the user has access to this slider for manually shifting the slide. The slide 121 has on its surface in facing relation to the set of brushes connecting the tracks of the ring to the rest of the element, conductive tracks 124 adapted to cooperate with said brushes for supplying current to the electric motor. These conductive tracks are connected to the supply source of the vehicle through, for example, conductive wires 125.

Figure 11:
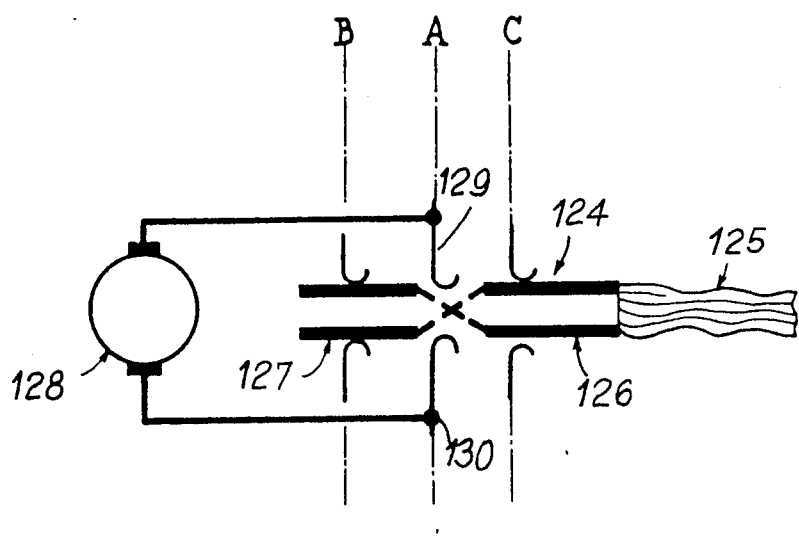

As can be seen in FIG. 11, the slide has two sets of conductive tracks 126 connected to the supply source of the vehicle so as have reverse polarities. Further, the two sets of tracks are separated by a gap in which the supply brushes of the motor 128 are no longer in contact with the conductive tracks, so that the supply current to the electric motor is cut off.

This device operates in the following manner:

The position of rest of the device is that indicated by the reference letter A in FIG. 11, i.e. that in which the brushes 129, 130 of the motor 128 are in facing relation to the gap between the two sets of conductive tracks. In this case, the motor is not supplied with current, and the anchoring pin, and consequently the strap return element, are in a given position.

If it is desired to shift this anchoring pin upwardly or downwardly, the slider 123 is manually acted upon so as to shift the slide 121 in the slideway 122 and therefore the conductive tracks 124 relative to the brushes 129, 130 of the motor. There is then reached for example the position indicated by the reference letter B in FIG. 11, in which the brushes are in contact with the set 127 of conductive tracks, so that the electric motor 128 is moved in a certain direction.

As the motor moves, the anchoring pin of the strap return element and the brushes also move until the brushes reach once again a position in facing relation to the gap between the two sets of conductive tracks.

The motor supply is then cut off and the motor stops moving and determines a new position of the anchoring pin of the strap return element in accordance with the displacement of the slider.

In the case where the slide is shifted in a direction opposed to that mentioned before, the brushes come into contact with the set 126 of conductive tracks, as shown at C in FIG. 11.

As the polarity of this set is reversed relative to that of the set 127, the electric motor is therefore supplied with current in the opposite direction and then moves in a direction opposed to that of the preceding case.

The motor moves in the other direction so long as the motor supply brushes have not returned to a position in facing relation to the gap between the two sets of tracks.

It will be understood that, as the strap return element is disposed on an anchoring mounted on the motor, it also follows this movement so that its position may be adjusted.

What is claimed is:

1. A device for adjusting the position of a strap return element of in particular a safety belt for a motor vehicle, said device comprising a tube, an electric driving motor having a field magnet, a shaft and an armature fixed on the shaft, the motor being mounted in the tube to be movable axially in the tube between two end positions an anchoring pin mounted on the motor, the strap return means being mounted on the anchoring pin so as to be movable by the motor between said two end positions, a control element for setting the position of the strap return element and the motor at any point of the travel between said two end positions, means for supplying current to the motor through the medium of the control element, means for preventing the rotation of the armature relative to the tube, the field magnet being rotatable about the armature and relative to the tube, the field magnet having an outer surface at least a part of which surface carries a screwthread, complementary screwthread means connected to the tube and cooperative with the screwthread of the field magnet in such manner as to move the motor and consequently the strap return element axially relative to the tube when the field magnet rotates, the means for preventing rotation of the armature comprising a slot in the tube, an end portion of the anchoring pin projecting into the tube through the slot, and fixing means for fixing the end portion of the anchoring pin to the shaft of the armature.

2. A device according to claim 1, wherein the complementary screwthread means are constituted by an internal screwthread in the tube.

3. A device according to claim 1, wherein the complementary screwthread means are constituted by at least three screwthreaded rods fixed in the tube.

4. A device according to claim 3, wherein the tube has a square cross-sectional shape and screwthreaded rods fixed in four corners of the tube are cooperative with the screwthread of the field magnet.

5. A device according to claim 1, wherein the means for preventing rotation of the armature further comprise a metal strip having an end portion fixed to the shaft of the armature and an opposite end portion having two wings defining recesses, a connecting member connected to the anchoring pin and having bosses engaged in said recesses, the tube having edge portions defining the slot in the tube and the connecting member being cooperative with the edge portions of the tube for retaining the anchoring pin relative to the tube.

6. A device according to claim 5, further comprising anti-friction means between a surface on the connecting member in facing relation to a surface on the field magnet for limiting the friction between the field magnet and the connecting member.

7. A device according to claim 6, wherein the anti-friction means comprise a cavity in the connecting member and a ball disposed in the cavity and engaged with said surface of the field magnet.

8. A device according to claim 5, comprising a spacer member disposed around the anchoring pin and between the connecting member and the strap return element, said spacer member being cooperative with said edge portions of the slot of the tube for guiding the anchoring pin when it is moved in the slot of the tube and for maintaining the strap return element at a predetermined distance from the connecting member.

9. A device according to claim 1, wherein the motor has a commutator and the means supplying current to the motor comprise a ring having an inner surface and connected to the armature, a first set of conductive tracks axially disposed on the inner surface of the ring, a first set of brushes connected to the commutator of the motor and in contact with the first set of conductive tracks, a second set of conductive tracks disposed alongside the slot of the tube and connected to a source of current of the vehicle through said control element, and a second set of brushes connecting the first set of conductive tracks to the second set of conductive tracks.

10. A device according to claim 9, wherein said control element comprises an inverting switch having three positions permitting the connection of the tracks of the second set of tracks to the source of current in such manner that the electric motor, and consequently the strap return element mounted thereon, move selectively in one direction and in the other direction to the desired set position and the cutting off of said source of current when the desired set position is reached.

11. A device according to claim 9, further comprising an insulating support member fixed to the tube and defining recesses on each side of the slot, the tracks of the second set of tracks being disposed on each side of the slot in said recesses.

12. A device according to claim 11, wherein the support member includes a slot provided in facing relation to the slot of the tube and deformable means for closing the slot in the support member.

13. A device according to claim 1, wherein the motor has a commutator and the means supplying current to the motor comprise a ring having an inner surface and connected to the armature, a first set of conductive tracks axially disposed on the inner surface of the ring, a first set of brushes connected to the commutator of the motor and in contact with the first set of conductive tracks, a second set of conductive tracks which are connected to the source of current of the vehicle for supplying current to the motor and separated from each other by a gap for cutting off the source of current from the motor, a second set of brushes cooperative with the second set of conductive tracks and connected to the first set of conductive tracks, a slide and a slider combined with the slide for manually moving the slide along the adjusting travel of the strap return element, the slide carrying the second set of conductive tracks and operative for adjusting the position of the cutting off of the source of current from the motor and therefore the set position of the motor and the strap return element.

14. A device according to claim 13, comprising a slideway defining a slot and provided for connection to the vehicle, the slide being slidably mounted in the slot of the slideway through which slot a part of the slide projects, a slider being connected to the projecting part of the slide, said slider and said slide being mounted to be manually movable along said slot of the slideway to the extent of the adjustable travel of the strap return element so as to adjust the position of the gaps for cutting off the source of current from the motor and determine the set position of the motor and the strap return element.

15. A device according to claim 14, wherein the second set of conductive tracks comprises two sets of conductive tracks connected to the source of current of the vehicle in such manner as to have inverse polarities and be separated by a gap for cutting off the source of current from the electric motor.

16. A device according to claim 14, wherein the second set of conductive tracks is constituted by three conductive tracks which are substantially in alignment, separated from one another by a gap for cutting off the source of current from the electric motor and connected to the source of current of the vehicle in such manner as to have successively alternating polarities.

17. A device according to claim 15, further comprising a third set of conductive tracks connected to the source of current and a third set of brushes cooperative with the third set of conductive tracks and connected to the second set of conductive tracks.

* * * * *